United States Patent
Alacar et al.

(10) Patent No.: US 10,891,089 B1
(45) Date of Patent: Jan. 12, 2021

(54) SYSTEM AND METHODS FOR USING AN AUTHENTICATION TOKEN WITH A CLOUD-BASED SERVER

(71) Applicant: KYOCERA DOCUMENT SOLUTIONS INC., Osaka (JP)

(72) Inventors: Arthur Alacar, Pacheco, CA (US); Michael Martin, Pacheco, CA (US)

(73) Assignee: KYOCERA DOCUMENT SOLUTIONS INC., Osaka (JP)

( * ) Notice: Subject to any disclaimer, the term of this patent is extended or adjusted under 35 U.S.C. 154(b) by 0 days.

(21) Appl. No.: 16/451,863

(22) Filed: Jun. 25, 2019

(51) Int. Cl.
  G06F 3/12      (2006.01)
  G06F 16/95     (2019.01)
  G06F 21/31     (2013.01)
  G06F 16/955    (2019.01)

(52) U.S. Cl.
  CPC .......... G06F 3/1238 (2013.01); G06F 3/1222 (2013.01); G06F 16/955 (2019.01); G06F 21/31 (2013.01)

(58) Field of Classification Search
  CPC .... G06F 3/1238; G06F 3/1222; G06F 16/955; G06F 21/31
  USPC ...................................................... 358/1.15
  See application file for complete search history.

(56) References Cited

U.S. PATENT DOCUMENTS

| | | | |
|---|---|---|---|
| 7,500,262 B1* | 3/2009 | Sanin ................. | G06Q 20/3674 726/2 |
| 8,584,213 B2 | 11/2013 | Evan et al. | |
| 8,760,679 B2 | 6/2014 | Watanabe | |
| 2004/0057075 A1* | 3/2004 | Stewart ................. | G06F 3/1253 358/1.15 |
| 2007/0279671 A1 | 12/2007 | Shouno | |
| 2012/0092689 A1* | 4/2012 | Ito ......................... | G06F 3/1206 358/1.13 |
| 2016/0077776 A1* | 3/2016 | Balinsky ............... | G06F 3/1238 358/1.14 |

FOREIGN PATENT DOCUMENTS

WO    2011/115987 A2    9/2011

* cited by examiner

*Primary Examiner* — Allen H Nguyen
(74) *Attorney, Agent, or Firm* — Millen, White, Zelano & Branigan, P.C.; William Nixon (57) ABSTRACT

A cloud-based server and a port monitor on a device provide authentication of a user to access print jobs on the server. An application may print or perform other operations from the cloud-based server to a printing device. The port monitor uploads data for a document to the cloud-based server. Once the data for the document is uploaded, a claim code is generated by the cloud-based server. The port monitor receives the claim code. The port monitor initiates the launch of a browser having a uniform resource locator (URL) address for the server along with the claim code. The user is authenticated using a login page and the claim code associated to the user to allow access to the document on the server.

9 Claims, 8 Drawing Sheets

SYSTEM AND METHODS FOR USING AN AUTHENTICATION TOKEN WITH A CLOUD-BASED SERVER

FIELD OF THE INVENTION

The present invention relates to authenticating user access to printing operations from a cloud-based server. More particularly, the present invention relates to authenticating user information to access a job stored on the cloud-based server using an authentication token with a claim code.

DESCRIPTION OF THE RELATED ART

A user should be authenticated prior to submitting a print job to a cloud-based server. The authentication determines its permission. It also allows the server to identify the user of a print job, or other processing instruction, being submitted. Authentication usually requires a client program to prompt the user to enter its username and password in a login dialog. Most client applications have no problem prompting a login dialog authenticate a user to a server, then submitting a print job to a cloud-based server. Other client applications, such as a port monitor, may find it difficult to show a login box because the application interferes with the normal printing flow.

SUMMARY OF THE INVENTION

A method for authenticating user access to a print job at a cloud-based server is disclosed. The method includes uploading job data from the print job to the cloud-based server using a port monitor. The method also includes generating a claim code by the cloud-based server. The method also includes providing the claim code to the port monitor. The method also includes launching a browser with a uniform resource locator (URL) address indicating the cloud-based server. The URL address includes the claim code. The method also includes receiving an authentication token at the browser from the cloud-based server. The method also includes authenticating user information at the browser. The method also includes assigning the authentication token to the claim code. The method also includes submitting the claim code and the authentication token to the cloud-based server to access the print job.

A method for authenticating user access to a job at a cloud-based server is disclosed. The method includes uploading job data for the job from a port monitor to the cloud-based server. The method also includes receiving a first uniform resource locator (URL) address at the port monitor. The first URL address refers to the uploaded job on the cloud-based server. The method also includes submitting a request for the job using the first URL address. The request includes job metadata information for the job. The method also includes assigning a claim code to the job including the job metadata information. The method also includes forwarding the claim code to the cloud-based server using a second URL address in a browser. The method also includes forwarding an authentication token to the browser from the cloud-based server. The method also includes authenticating a user session to access the job according to the claim code. The authentication token authenticates user access. The method also includes forwarding the job to a printing device from the cloud-based server.

A cloud-based printing system is disclosed. The cloud-based printing system includes a cloud-based server to store data from print jobs. The cloud-based printing system also includes a computing device having a port monitor. The port monitor is configured to upload job data for a job to the cloud-based server. The cloud-based printing system also includes a printing device to process the job data for the job received from the cloud-based server. The cloud-based server is configured to generate a claim code after the job data is uploaded and to generate an authentication token upon presentation of the claim code. The computing device is configured to open a browser to receive user information to activate the authentication token. The cloud-based server is configured to assign the claim code to a user session to access the job upon receipt of the authentication token.

BRIEF DESCRIPTION OF THE DRAWINGS

Various other features and attendant advantages of the present invention will be more fully appreciated when considered in conjunction with the accompanying drawings.

DETAILED DESCRIPTION OF THE PREFERRED EMBODIMENTS

Reference will now be made in detail to specific embodiments of the present invention. Examples of these embodiments are illustrated in the accompanying drawings. Numerous specific details are set forth in order to provide a thorough understanding of the present invention. While the embodiments will be described in conjunction with the drawings, it will be understood that the following description is not intended to limit the present invention to any one embodiment. On the contrary, the following description is intended to cover alternatives, modifications, and equivalents as may be included within the spirit and scope of the appended claims. Numerous specific details are set forth in order to provide a thorough understanding of the present invention.

A user submits a print job to a cloud-based server, authenticates it, and then claims the print job later for printing or other operations. Once the user submits the print job, a claim code is provided that is not associated with a user. The claim code is presented to claim the print job. Most applications authenticate the user first then do printing operations. The disclosed embodiments do not want to stop printing to wait for authentication. Instead, the printing process continues without interruption. Authentication may be done on a website, which may be difficult for a printing application to do. Printing application does not need a user interface to authenticate.

The disclosed embodiments minimize printing flow interruption by allowing a client application to submit a print job even without prior authentication. This feature works by issuing a claim code to the submitted print job or other printing operation, thereby redirecting the user to a web application to perform post authentication. The job is associated to the authenticated user identified by the claim code. This process is beneficial because it minimizes and simplifies implementation efforts in client programs. The disclosed embodiments also reduce development complexity of the application because authentication is offloaded to a browser. Application does not need updating if authentication protocol via the browser is updated.

The disclosed system and associated methods provide the ability to support possible upload modes. One mode may be a pass-through mode. Another mode may be a buffered mode. It also allows uninterrupted printing flow for a printing application, such as Windows Port Monitor™. A unique claim code is used to identify a submitted print job. A browser is launched to claim a job either by a previously authenticated user or with a new authentication. Unclaimed jobs expire after certain conditions are met along with job data cleanup to avoid orphaned jobs for security and storage consideration purposes. The disclosed processes do not let jobs stay in limbo but may require them to be claimed after a certain point.

Although a print job or a job is discussed herein, the disclosed embodiments may pertain to any type of operations performed on a printing device. These operations include copying, scanning, storing of documents, editing documents, faxing, and the like. The user wishes to send a document, as data, to another device from the cloud-based server and to authenticate the access to that document. The disclosed embodiments may refer to the data for the document as a print job or job.

Figure 1A:
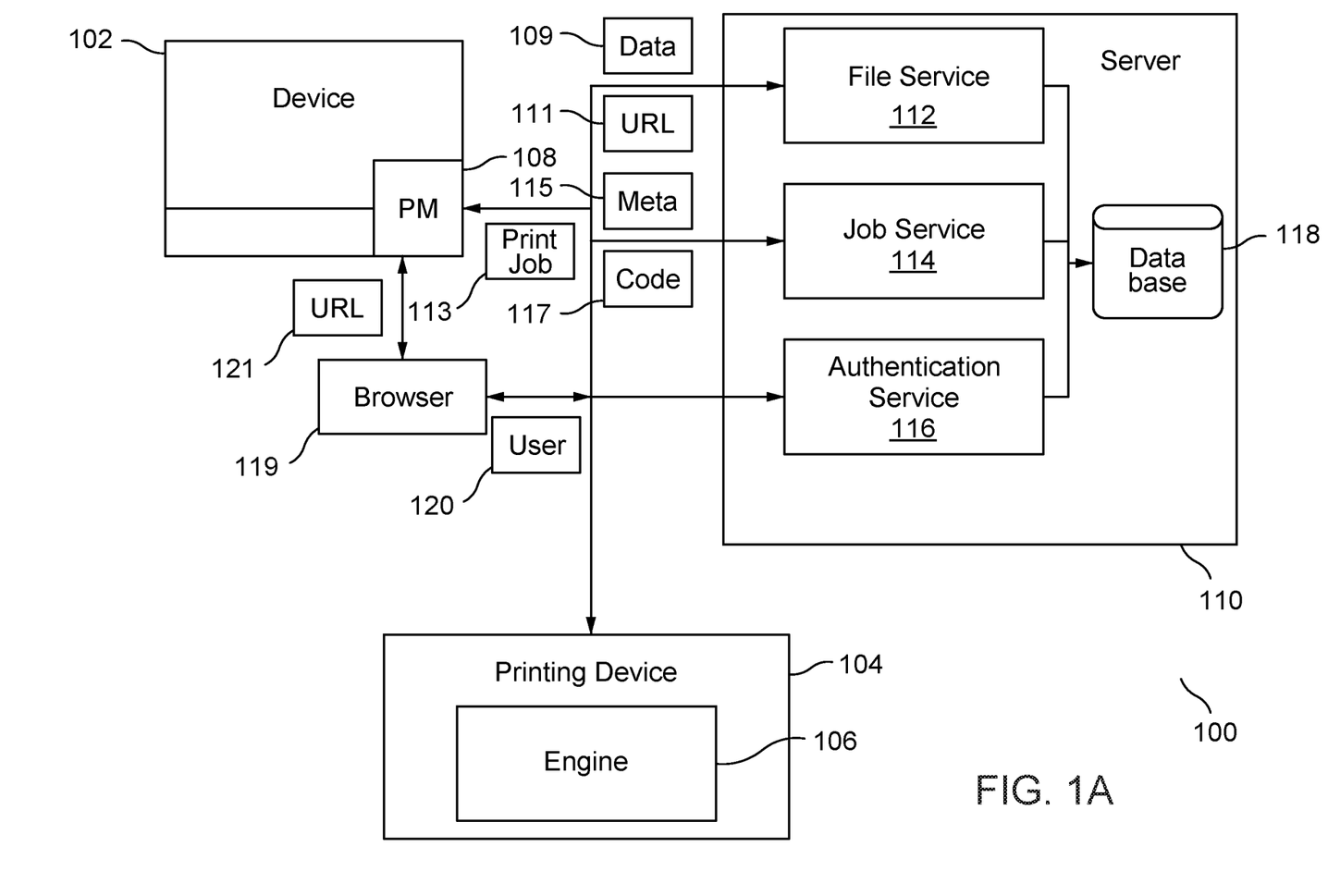
FIG. 1A illustrates a system to print using a cloud-based server according to the disclosed embodiments.
Figure 1B:
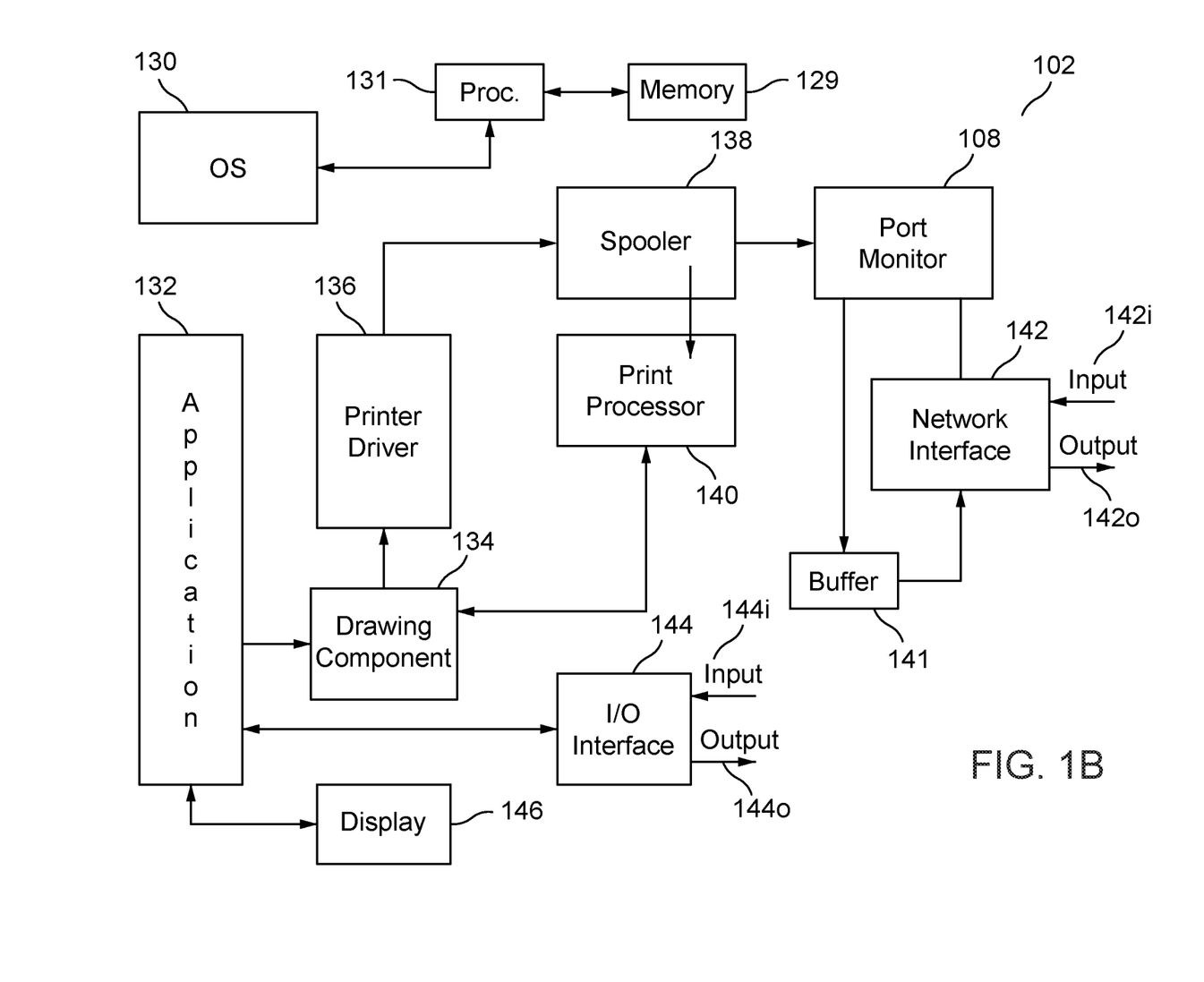
FIG. 1B illustrates a device having a port monitor to print to the cloud-based server according to the disclosed embodiments.

FIG. 1A depicts a system 100 to print using a cloud-based server 110 according to the disclosed embodiments. FIG. 1B depicts a device 102 having a port monitor 108 to print to the cloud-based server according to the disclosed embodiments. FIG. 1B shows the components that may be utilized for printing within system 100. System 100 may include a network that connects the various components shown. This network may be a wireless or wired network as well as a local area network (LAN) or wide area network (WAN). The various components in system 100 may include internet protocol (IP) addresses that uniquely identify the components within the network so that information may be exchanged. Preferably, any network within system 100 is a secure network. A user should be authenticated before using any component within system 100 or accessing data or information from such component.

System 100 includes device 102 connected to cloud-based server 110 over a network. System 100 also includes printing device 104, which receives print jobs from cloud-based server 110 as well as directly from device 102. System 100 also may include other components to perform printing and scanning operations. System 100 may include a plurality of devices 102 and printing devices 104 that interact with server 110.

Device 102 may be a computing device, such as a computer, mobile tablet, mobile device, laptop, another server, and the like. The features of device 102 are disclosed in greater detail below. Device 102 prints within system 100 using port monitor 108. Port monitor 108 is a printing subsystem that passes raw print job data 109 from spooler 138 to a printing device 104. In some embodiments, port monitor 108 uploads raw print job data 109 to cloud-based server 110.

Cloud-based server 110 preferably is a secure or private server such that one need to be authenticated before accessing data thereon. Prior to submitting a print job to cloud-based server 110, a user first must be authenticated to determine its permission to access the server. Server 100 should identify the owner of the print job being submitted. Authentication may require a client program to prompt the user to enter his/her username, password, personal identification number (PIN), or other such private information. The disclosed embodiments provide such processes to authenticate the user without printing flow interruption.

Components on cloud-based server 110 include file service module 112 that receives uploaded raw job data 109 from port monitor 108 over the network. Port monitor 108 may initiate a job submission request to server 110. Port monitor 108 then may upload raw job data 109 to file service module 112. File service module 112 may generate and send a unique access uniform resource locator (URL) address 111 to port monitor 108. URL address 111 is used as a reference to the just uploaded job data.

Cloud-based server 110 also includes job service module 114. Job service module 114 receives a request for print job 113 which also includes job metadata information 115. Job metadata information 115 may include details about the job such as job name, file name, file size, encoding type, content type, document type, timestamps, and the like. Cloud-based server 110 through job service module 114 issues a unique claim code 117 for print job 113 and saves this information in database 118. Claim code 117 also is provided to port monitor 108.

Authentication service module 116 of cloud-based server 110 acts in conjunction with port monitor 108 and internet browser 119 to authenticate the user before sending print job 113 to printing device 104. Port monitor 108 initiates a redirection from device 102 to launch browser 119 by passing along claim code 117 in a URL address 121. Claim code URL address 121 points to cloud-based server 110. Authentication service module 116 interacts with browser to obtain user information 120. Authentication service module 116 assigns claim code 117 to that user presenting user information 120. The user will now see print job 113 in his/her job list, such as displayed on device 102.

The user may instruct that cloud-based server 110 submit print job 113 to printing device 104. Printing device 104 may be a multi-functional printing device in that it may print, copy, scan, edit, fax, store, and modify a document or documents. Printing device 104 also includes engine 106 that helps complete these functions. Printing device 104 and engine 106 are disclosed in greater detail below.

The processes associated with port monitor 108, cloud-based server 110, and printing device 104 are disclosed in greater detail below. Referring to FIG. 1B, a block diagram of device 102 is shown. Device 102 may be a data processing apparatus that includes components that are enabled by a processor 130 executing a program loaded from a memory 129. Memory 129 may have a location within device 102. Preferably, memory 129 is a random access memory (RAM) within device 102. The program may be loaded into memory 129 from another location or device.

Operating system 130 operates on device 102. Operating system 130 may interact with processor 131 to launch application 132 and enable the components for printing shown in FIG. 1B. Application 132 may be software instructions that are loaded onto processor 130 from memory 129 to convert device 102 into a special purpose machine. Alternatively, application 132 may run on device 102 with other programs. Application 132 may be invoked by the user. In some embodiments, application 132 includes a word processor and an image processing function. Application 132 creates processed data by processing data, which is stored in memory 129 or other memory in response to a user instruction. If the user wants to print the processed data created by the execution of application 132, then the user may launch a graphical user interface (GUI) using display 146 to display a print wizard or other information capture interface, such as detecting gestures or speech, in order to select a command to print. Other commands may include one to scan or send the processed data to another device or location within system 100.

Device 102 includes a network interface 142 and an input/output (I/O) interface 144. Network interface 142 receives data based on a TCP/IP protocol or the like through the network of system 100. Network interface 142 also outputs print data or processed data processed by device 102 through the network of system 100. Network interface 142 may use input connection 142i and output connection 142o to communicate over system 100.

I/O interface 144 receives an input from an inputting device, such as a keyboard, touch screen, heads up display, motion or speech detector, mouse, and the like. I/O interface 144 may send data and instructions such as an event notification to application 132. I/O interface 144 may cause display 146 to display a result of execution of application 132 via a graphics driver or the like in order to provide the GUI to capture instructions and commands from the user. I/O interface 144 may use input connection 144i and output connection 144o to perform these functions.

When a print or scan command is issued, an instance of a format converting part is generated. The print data is created with a format acceptable to a printing device, such as printing device 104. The print data also may be compatible with specifications set forth by cloud-based server 110 or system 100. The format converting part of device 102 may include drawing component 134 and print processor 140. For example, the format converting part may contain a graphics display interface (GDI). If the user issues a print command of the processed data through application 132, then the format converting part calls drawing component 134 to create an instance of a drawing component contained in the processed data.

Drawing component 134 may send a format specific to an application such as image metadata to print processor 140 in order to change the format into a specific format including raster data, which may be used by printing device 104. In some embodiments, the data structure may be registered as a data structure for registering a data value associated with drawing data and a data structure for registering a data value for an external transmission.

In some embodiments, text contained in the processed data is sent to printer driver 136 together with the setting of the font and other information. Printer driver 136 performs processing such as setting of a text character, setting of a line interval and a character interval, setting of margins, setting of a text arrangement area and the like in order to create a format specific to printing device 104. Printer driver 136 may generate print data in order to further control printing device 104 by describing the page description language (PDL) or printer job language (PJL) in the page description language describing area with respect to image data and the text during and after the disclosed processing.

In order to generate the print data of a format specific to printing device 104, printer driver 136 sends the created print data to spooler 138 so that the spooler transfer the data being processed to the format converting part through print processor 140. The data is output from device 102 via spooler 138 and port monitor 108 after completion of creation of the print data, as shown by job raw data 109.

Port monitor 108 sends out the print data, or raw data 109, in accordance with an output destination. Port monitor 108 acquires, from the described data structure, output destination information such as an IP address or a host name of another device within system 100, such as printing device 104 or cloud-based server 110. Raw print data 109 is sent to this location through network interface 142. In some embodiments, port monitor 108 may use buffer 141 to store the processed data until it is ready to be uploaded over system 100. Port monitor 108 also may request printing or other operations on printing device 104.

In summary, the disclosed embodiments, application 132 is invoked by the user to create or edit a document or other file. In turn, data is created and processed for the document. If the user instructs printing of the data, then printer driver 136 receives a specific unit of data from application 132. The data is used for the requested print job. Printer driver 136 sequentially generates a PDL image for every specific unit of data. The generated PDL image is passed to spooler 138. Port monitor 108 sequentially receives the print job, which may be the PDL image, from spooler 138. Port monitor 108 sets up a port in which to transfer job raw data 109 for the print job to a component on system 100.

Figure 2:
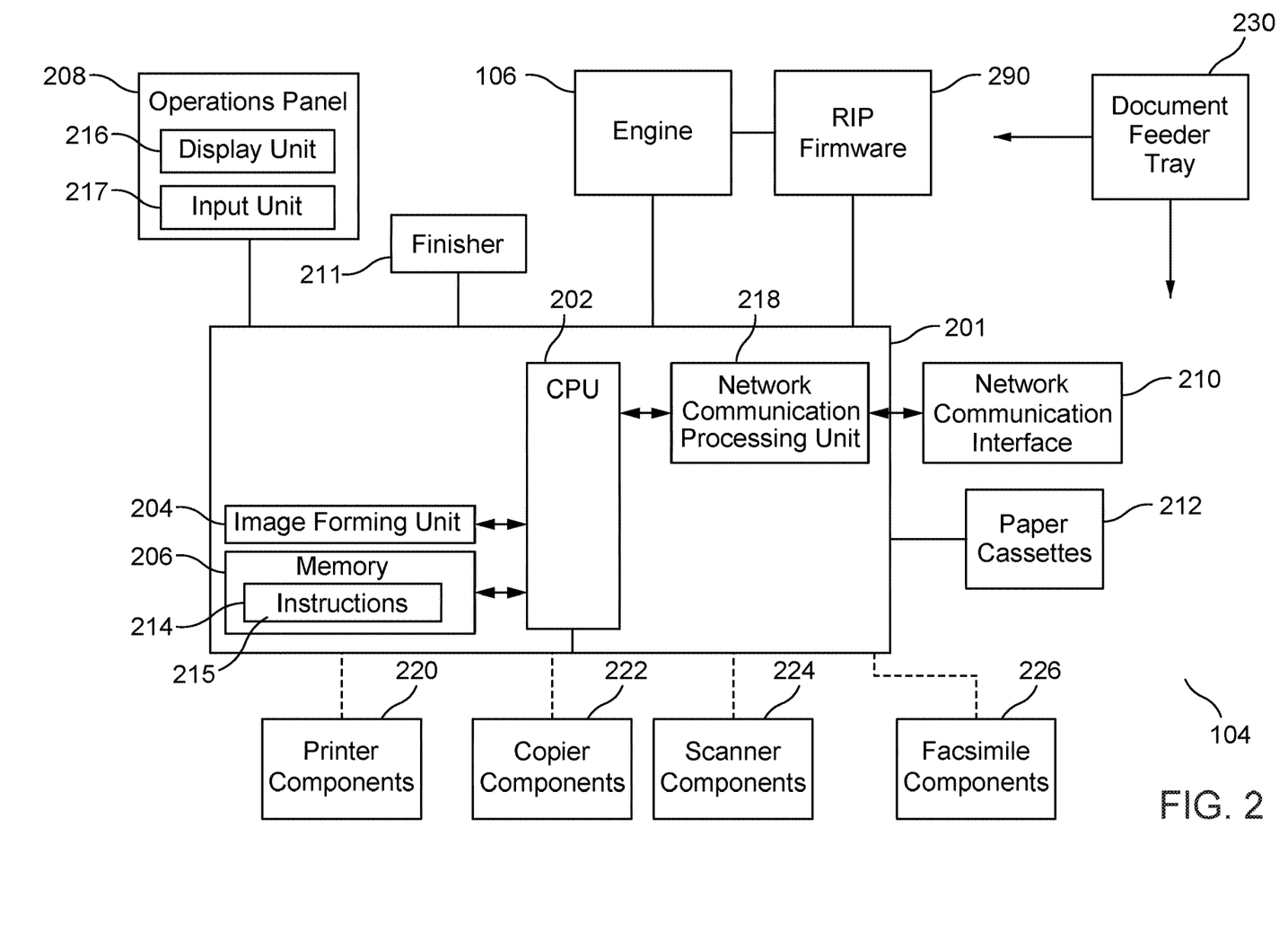
FIG. 2 illustrates a block diagram of components of the printing device used in conjunction with the authentication system according to the disclosed embodiments.

FIG. 2 illustrates a block diagram of components of printing device 104 used in conjunction with system 100 according to the disclosed embodiments. The architecture shown in FIG. 2 may apply to any multi-functional printer or image forming apparatus that scans documents to perform other functions, such as printing, storing, copying, and the like. As disclosed above, printing device 104 may send and receive data from device 102 through port monitor 108 or cloud-based server 110.

Printing device 104 includes a computing platform 201 that performs operations to support these functions. Computing platform 201 includes a computer processing unit (CPU) 202, an image forming unit 204, a memory unit 206, and a network communication interface 210. Other components may be included but are not shown for brevity. Printing device 104, using computing platform 201, may be configured to perform various operations, such as scanning, copying, printing, receiving or sending a facsimile, or document processing. As such, printing 104 may be a printing device or a multi-function peripheral including a scanner, and one or more functions of a copier, a facsimile device, and a printer. To provide these functions, printing device 104 includes printer components 220 to perform printing operations, copier components 222 to perform copying operations, scanner components 224 to perform scanning operations, and facsimile components 226 to receive and send facsimile documents. CPU 202 may issue instructions to these components to perform the desired operations.

Printing device 104 also includes a finisher 211 and one or more paper cassettes 212. Finisher 211 includes rotatable downstream rollers to move papers with an image formed surface after the desired operation to a tray. Finisher 211 also may perform additional actions, such as sorting the finished papers, binding sheets of papers with staples, doubling, creasing, punching holes, folding, and the like. Paper cassettes 212 supply paper to image the various components 220, 222, 224, and 226 to create the image formed surfaces on the papers. Paper cassettes 212 may include papers having various sizes, colors, composition, and the like. Paper cassettes 212 may be removed to refill as needed.

Document processor input feeder tray 230 may be the physical components of printing device 104 to receive papers and documents to be processed. A document is placed on or in document processor input feeder tray 230, which moves the document to other components within printing device 104. The movement of the document from document processor input feeder tray 230 may be controlled by the instructions input by the user. For example, the document may move to a scanner flatbed for scanning operations. Thus, document processor input feeder tray 230 provides the document to scanner components 220. As shown in FIG. 2, document processor input feeder tray 230 may interact with engine firmware 106 to perform the desired operations.

Memory unit 206 includes memory storage locations 214 to store instructions 215. Instructions 215 are executable on CPU 202 or other processors associated with printing device 104, such as any processors within components 220, 222, 224, or 226. Memory unit 206 also may store information for various programs and applications, as well as data specific to printing device 104. For example, a storage location 214 may include data for running an operating system executed by computing platform 201 to support the components within printing device 104. According to the disclosed embodiments, memory unit 206 may store the tokens and codes used in performing the authentication operations for printing device 104.

Memory unit 206 may comprise volatile and non-volatile memory. Volatile memory may include random access memory (RAM). Examples of non-volatile memory may include read-only memory (ROM), flash memory, electrically erasable programmable read-only memory (EEPROM), digital tape, a hard disk drive (HDD), or a solid-state drive (SSD). Memory unit 206 also includes any combination of readable or writable volatile memories or non-volatile memories, along with other possible memory devices.

Computing platform 201 may host one or more processors, such as CPU 202. These processors are capable of executing instructions 215 stored at one or more storage locations 214. By executing these instructions, the processors cause printing device 104 to perform various operations. The processors also may incorporate processing units for specific purposes, such as application-specific integrated circuits (ASICs) and field programmable gate arrays (FPGAs). Other processors may be included for executing operations particular to components 220, 222, 224, and 226. In other words, the particular processors may cause printing device 104 to act as a printer, copier, scanner, and a facsimile device.

Printing device 104 also includes an operations panel 208, which may be connected to computing platform 201. Operations panel 208 may include a display unit 216 and an input unit 217 for facilitating interaction with a user to provide commands to printing device 104. Display unit 216 may be any electronic video display, such as a liquid crystal display (LCD). Input unit 217 may include any combination of devices that allow users to input information into operations panel 208, such as buttons, a touch screen, a keyboard or keypad, switches, dials, and the like. Preferably, input unit 217 includes a touch-screen digitizer overlaid onto display unit 216 that senses touch to receive inputs from the user. By this manner, the user interacts with display unit 216.

Printing device 104 also includes network communication processing unit 218. Network communication processing unit 218 may establish a network communication, such as a wireless or wired connection with one or more other image forming apparatuses and a server in an image forming system. CPU 202 may instruct network communication processing unit 218 to transmit or retrieve information over a network using network communication interface 210. As data is received at computing platform 201 over a network, network communication processing unit 218 decodes the incoming packets and delivers them to CPU 202. CPU 202 may act accordingly by causing operations to occur on printing device 104. CPU 202 also may retrieve information stored in memory unit 206, such as settings for printing device 104.

Printing device 104 also includes engine 106. Engine 106 may be a combination of hardware, firmware, or software components that act accordingly to accomplish a task. For example, engine 106 is comprised of the components and software to print a document. It may receive instructions from computing platform 201 after user input via operations panel 208. Alternatively, engine 106 may receive instructions from other attached or linked devices.

Engine 106 manages and operates the low-level mechanism of the printing device engine, such as hardware components that actuate placement of toner onto paper. Engine 106 may manage and coordinate the half-toner, toner cartridges, rollers, schedulers, storage, input/output operations, and the like. Raster image processor (RIP) firmware 290 that interprets the page description languages (PDLs) may transmit and send instructions down to the lower-level engine 106 for actual rendering of an image and application of the toner onto paper during operations on printing device 104.

Figure 3:
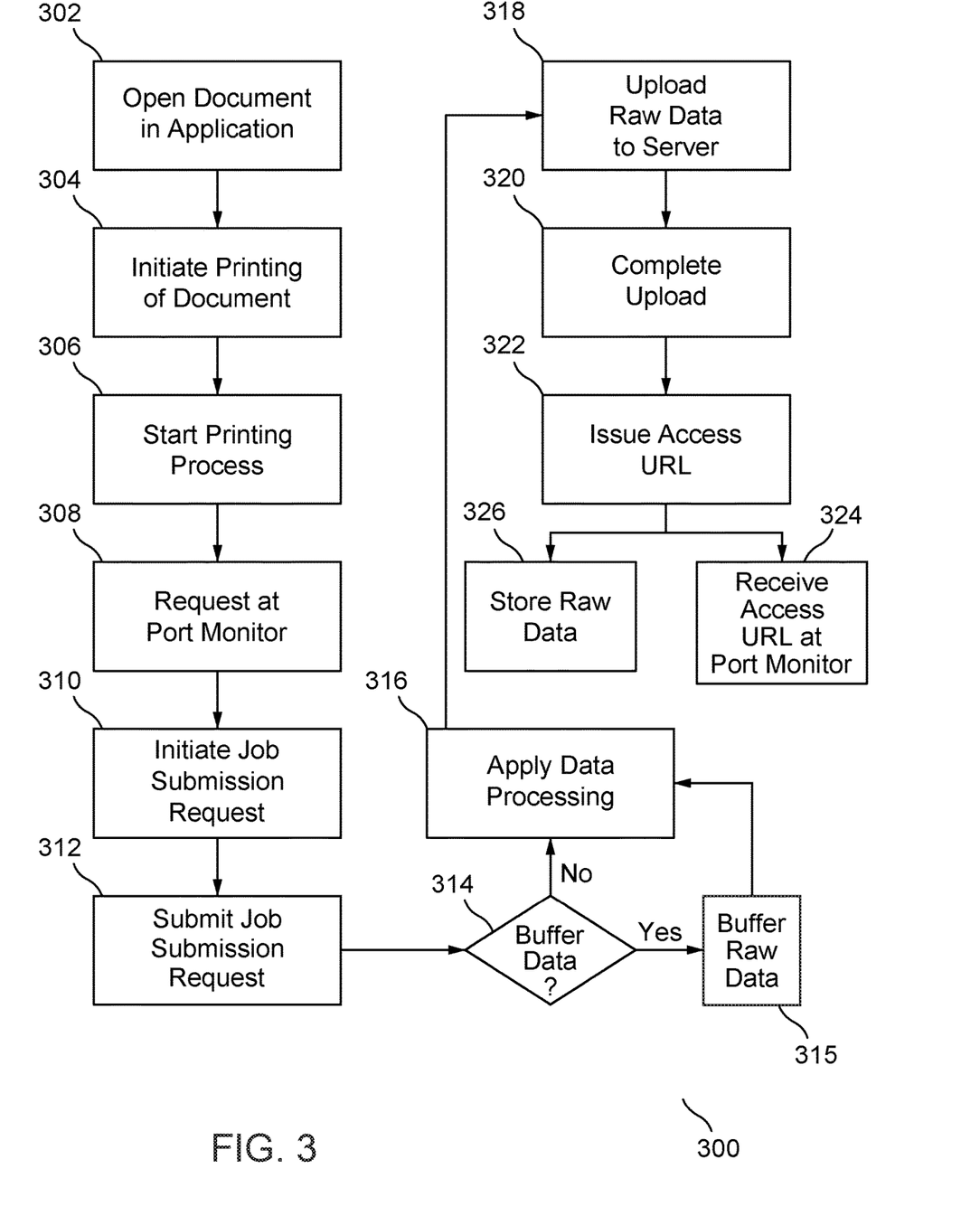
FIG. 3 illustrates a flowchart for uploading data for a print job to the cloud-based server according to the disclosed embodiments.

FIG. 3 depicts a flowchart 300 for uploading data for a print job 113 to cloud-based server 110 according to the disclosed embodiments. The disclosure of flowchart 300 may refer to elements of FIGS. 1A, 1B, and 2 in disclosing the features of FIG. 3. Flowchart 300, however, is not limited to the embodiments disclosed by FIGS. 1A, 1B, and 2.

Step 302 executes by opening or creating a document in application 132 on device 102. As disclosed above, data may be generated, modified, or processed within the document. For example, a user may enter text or images into the document. Application 132 may be a word processing application, spreadsheet, and the like. Step 304 executes by initiating printing or other operations of the document from device 102. The user may initiate printing by entering commands or by selecting options from a menu. Step 306 executes by starting the printing process within device 102. As disclosed above, printer driver 136, spooler 138, and other components generate the data for the print job of the document.

Step 308 executes by receiving the print request at port monitor 108. Port monitor 108 may perform any necessary internal processing including identifying a destination for the print job for the document. In some embodiments, the print operations may be completed using cloud-based server 110. The print job, as print job 113, may be stored on cloud-based server 110 and then forwarded to printing device 104. Alternatively, port monitor 108 may identify printing device 104 to receive the print job.

Step 310 executes by initiating a job submission request from port monitor 108. Step 312 executes by submitting the job submission request to cloud-based server 110. Port monitor 108 may initiate and submit the job submission request to server 110 by calling its application program interfaces (APIs) to interface with the server.

Step 314 executes by determining whether the raw data from port monitor 108 is to be buffered. In some embodiments, the data for the entire print job is collected before upload to cloud-based server 110. If yes, then step 315 executes by buffering raw data 109 in buffer 141 as it comes from port monitor 108. Port monitor 108 may be instructed to enter a buffered mode that collects the data in buffer 141. Flowchart 300 then proceeds to step 316, disclosed below.

If step 314 is no, then flowchart 300 proceeds directly to step 316. If the buffered mode is not used, then a pass-through mode is used so that raw data 109 are directly uploaded to cloud-based server 110 using a streaming or chunk-by-chunk method. Before being uploaded, step 316 executes by applying data processing to raw data 109 before it leaves network interface 142. Data processing operations include compression, encryption, encoding, signing, and the like that are applied to the data. In some embodiments, step 316 may be optional in that raw data 109 is streamed directly from network interface 142 without any processing.

Step 318 executes by uploading raw data 109 to cloud-based server 110. The data are uploaded using file service module 112. File service module 112 receives raw data 109 within cloud-based server 110. In some embodiments, file service module 112 may buffer the received data until the upload is complete. It also may apply data processing operations on the received data to decode, decrypt, and the like.

Step 320 executes by completing the upload operations for raw data 109. An indication that the data transfer is complete may be received at file service module 112. Step 322 executes by issuing an access URL address 111. Access URL address 111 may be a unique access URL address to reference the raw data just uploaded from device 102. Access URL address 111 also may be known as the upload URL address. Step 324 executes by receiving access URL address 111 at port monitor 108. Port monitor 108 may keep access URL address 111 until print job 113 is ready to be submitted to cloud-based server 110. Step 326 executes by storing uploaded raw data 109. In some embodiments, file service module 112 may store the raw data on database 118.

Figure 4:
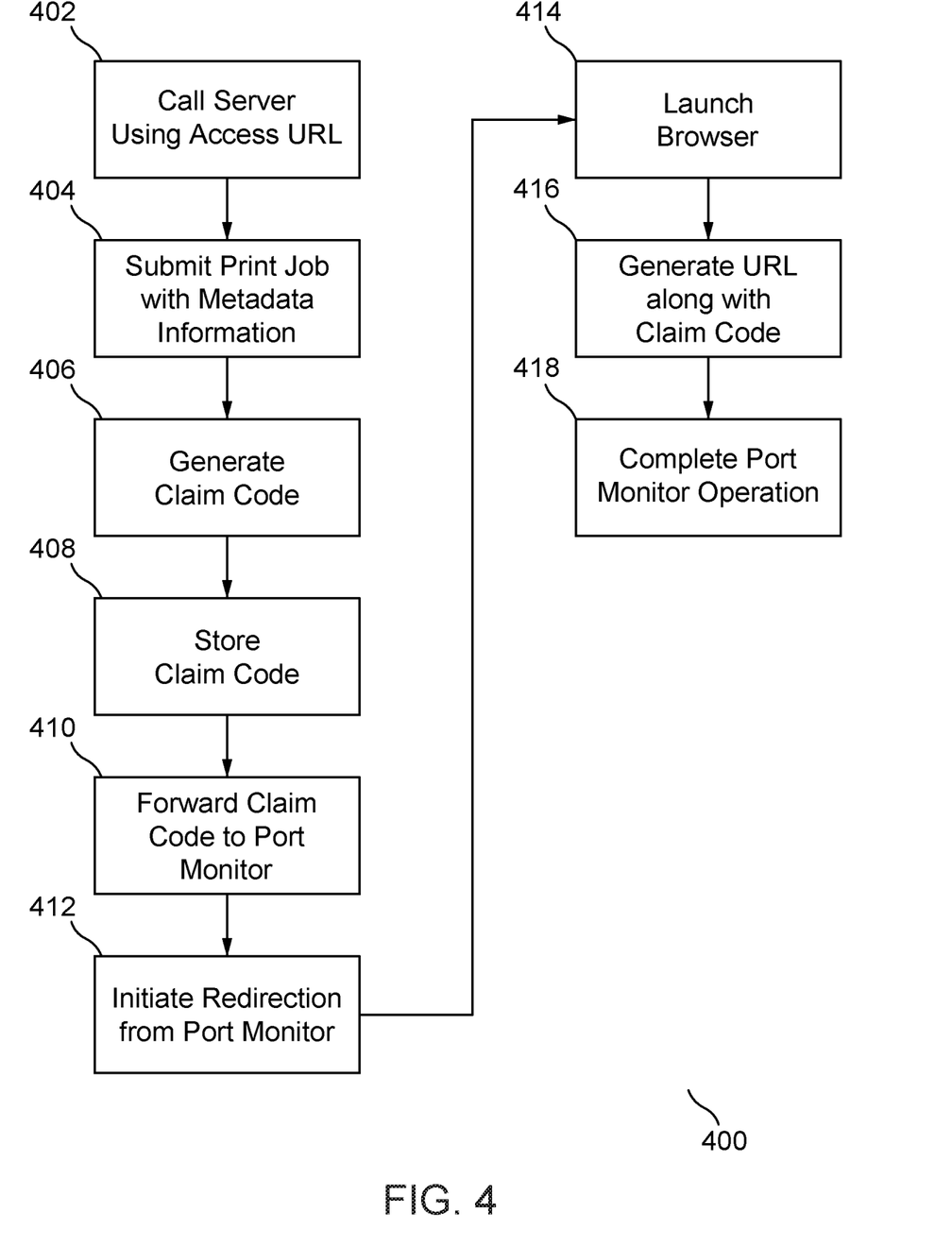
FIG. 4 illustrates a flowchart for providing a claim code for the uploaded print job according to the disclosed embodiments.

FIG. 4 depicts a flowchart 400 for providing a claim code for the uploaded print job according to the disclosed embodiments. The disclosure of flowchart 400 may refer to elements of FIGS. 1A, 1B, and 2 in disclosing the features of FIG. 4. Flowchart 400, however, is not limited to the embodiments disclosed by FIGS. 1A, 1B, and 2.

Step 402 executes by calling cloud-based server 110 using access URL address 111. Port monitor 108 may call another cloud-based printing system API using access URL address 111. Access URL address 111 directs the communication interface to job service module 114. Step 404 executes by submitting print job 113 to job service module 114 along with job metadata information 115. Port monitor 108 submits job metadata information 115 to complete print job 113. Metadata information 115 may include details about the print job, or document, such as job name, file name, file size, encoding type, content type, document type, timestamps, and the like. When associated with raw data 109, the data and information for print job 113 is captured at cloud-based server 110. Job service module 114 may use the unique URL address of access URL address 111 to identify the raw data uploaded for the print job.

Step 406 executes by generating claim code 117 for print job 113. Claim code 117 is a unique claim code associated with print job 113. It identifies print job 113 from a plurality of print jobs stored on cloud-based server 110. Claim code 117 may be in a variety of forms, including a random string, an integer form, a universally unique identifier, and the like. In some embodiments, information provided by port monitor 108, such as metadata information 115, may be used to generate claim code 117. Step 408 executes by storing claim code 117 in database 118. Job service module 114 may configure claim code 117 to identify print job 113 within database 118.

Step 410 executes by forwarding claim code 117 to port monitor 108 using the communication interface between the port monitor and job service module 114. Thus, claim code 117 is provided to port monitor 108 as well as kept by cloud-based server 110. Step 412 executes by initiating a redirection from port monitor 108 from cloud-based server 110 to a browser 119. Browser 119 may be located on device 102 and displayed on display 146. Alternatively, browser 119 may be located on another device, such as an application on a mobile device. Port monitor 108 may send a command to the application to enable browser 119.

Step 414 executes by launching browser 119. Step 416 executes by generating a claim code URL address 121 that includes claim code 117. Port monitor 108 passes along claim code 117 that is embedded or placed into claim code URL address 121. Claim code URL address 121 points to cloud-based server 110. Thus, the claim code URL address directs a call to job service module 114 to set up the communication interface over system 100.

For example, the URL address to cloud-based server 110 may be https://jp.anytime-print.com/jobclaims. The claim code may be aeb59781-89a3-4bd9-9361-4059aabe82d5. Thus, the claim code URL address may be https://jp.anytime-print.com/jobclaims/ aeb59781-89a3-4bd9-9361-4059aabe82d5. Port monitor 108 delivers claim code 117 with the URL to cloud-based server 110. Step 418 executes by completing operations at port monitor 108. Port monitor 108 is not needed for further operations to authenticate the user to access print job 113. It now may commence additional printing operations for device 102. Cloud-based server 110 may release any resources associated with communicating with port monitor 108.

Figure 5:
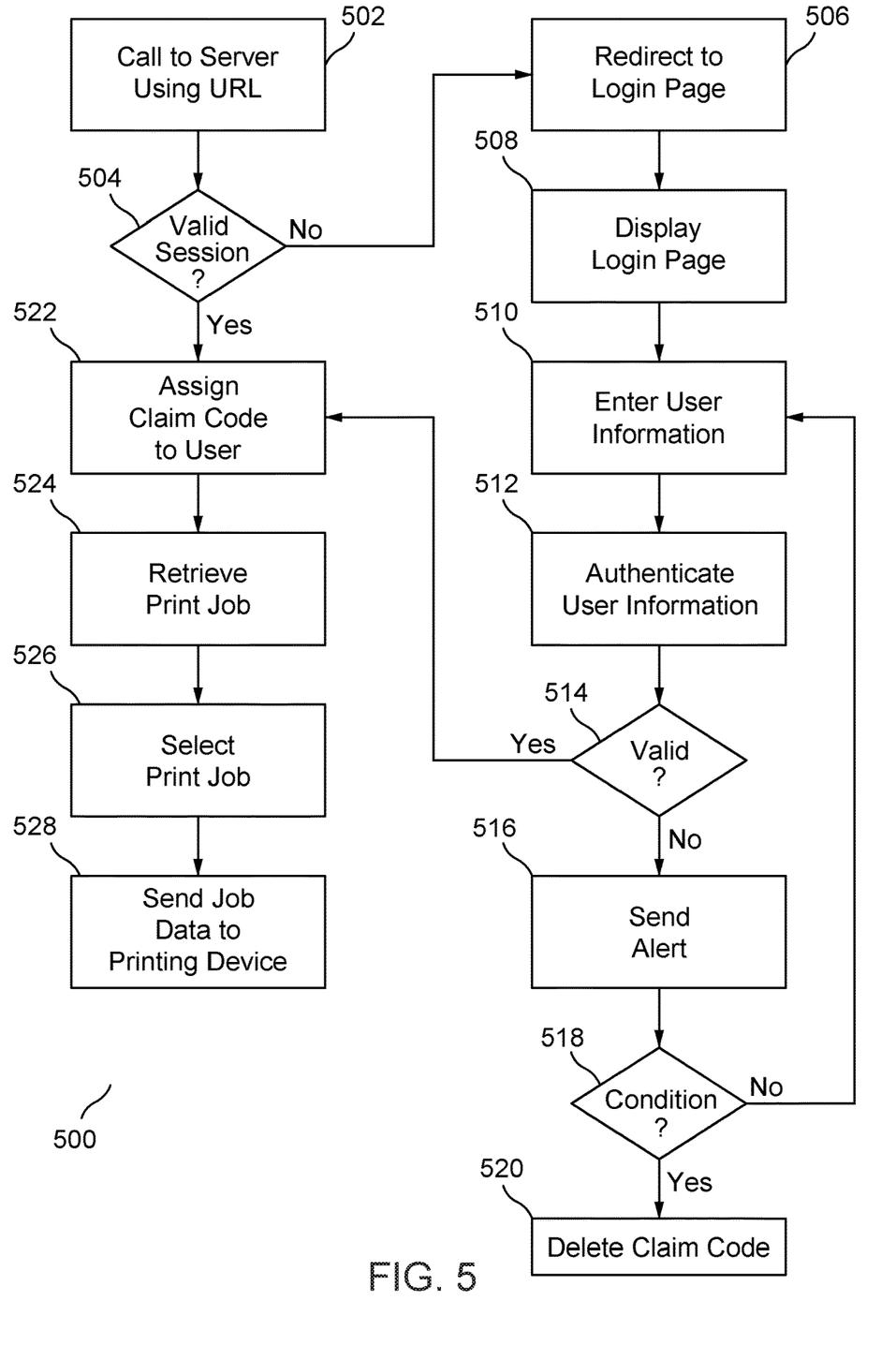
FIG. 5 illustrates a flowchart for authenticating user to access the print job from the cloud-based server according to the disclosed embodiments.

FIG. 5 depicts a flowchart 500 for authenticating user to access the print job from the cloud-based server according to the disclosed embodiments. The disclosure of flowchart 500 may refer to elements of FIGS. 1A, 1B, 2, and 6 in disclosing the features of FIG. 5. Flowchart 500, however, is not limited to the embodiments disclosed by FIGS. 1A, 1B, 2, and 6.

Step 502 executes by calling to cloud-based server 110 using claim code URL address 121 from browser 119. As disclosed in FIG. 4, claim code URL address 121 includes claim code 117. Step 504 executes by determining whether a valid and authentication user session already exists. If yes, then flowchart 500 proceeds to step 522, disclosed below. If step 504 is no, then step 506 executes by redirecting browser 119 to a login page. Browser 119 also calls to authentication service module 116 to initiate the authentication process for the user.

Figure 6:
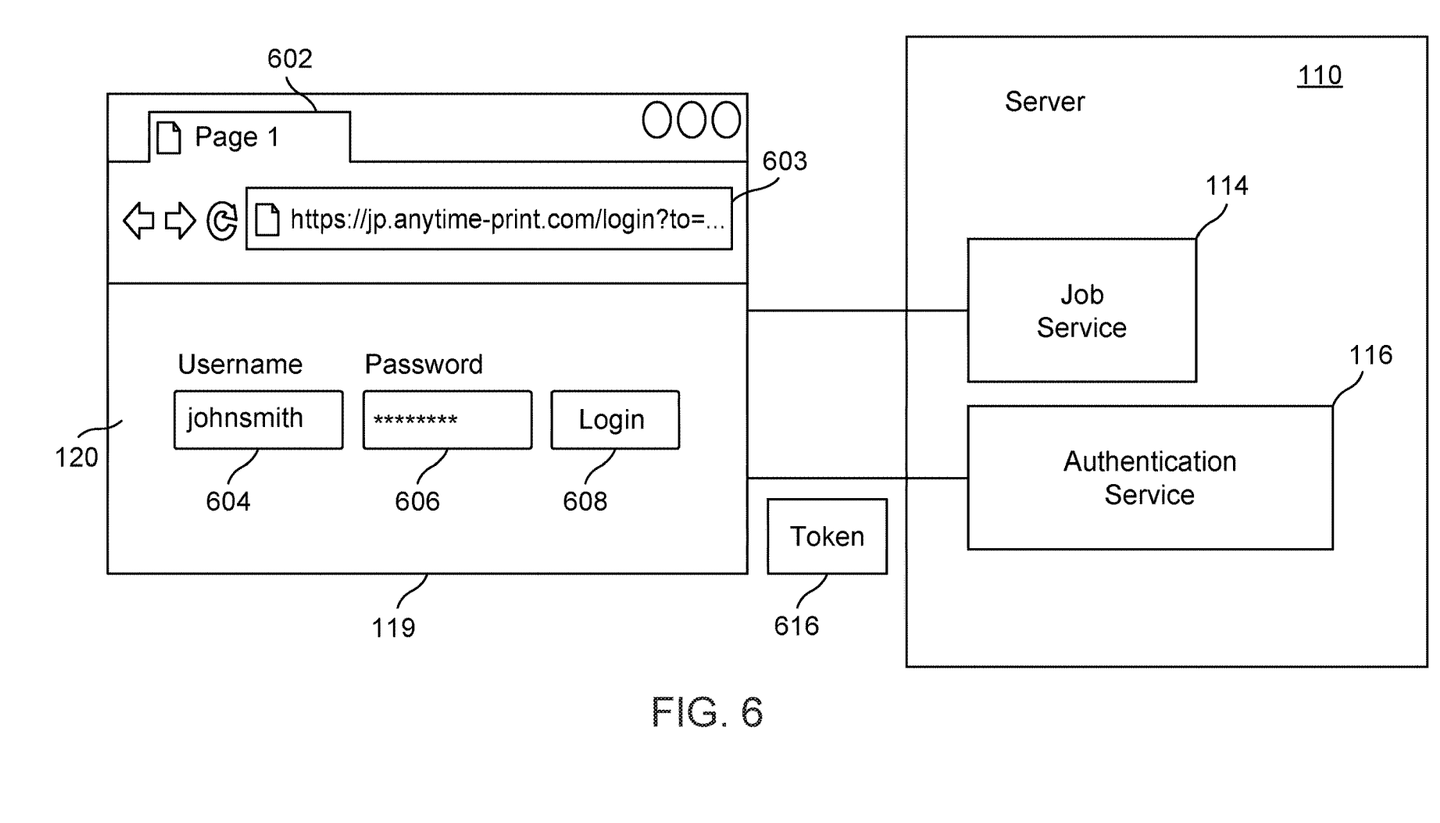
FIG. 6 illustrates a block diagram of a login page within a browser to authenticate a user according to the disclosed embodiments.

Step 508 executes by displaying the login page to authenticate a user for a session to access print job 113 from cloud-based server 110. An example of a login page 602 within browser 119 may be disclosed by FIG. 6. FIG. 6 depicts a block diagram of a login page 602 within a browser 119 to authenticate a user according to the disclosed embodiments. Information entered into browser 119 may be sent to cloud-based server 110. Job service module 114 may pass control of the authentication process to authentication service module 116 at this point. The URL address for the login page, or URL address 603, may differ from the previous URL addresses used to upload the print job and present claim code 117 to cloud-based server 110.

Step 510 executes by entering user information 120 for the user onto login page 602. For example, username field 604 may receive the username and password field 606 may receive a password associated with the username. Button 608 instructs browser 119 to send the user information to authentication service module 116. Step 512 executes by authenticating user information 120 with the credentials for the user stored on cloud-based server 110. Alternatively, authentication service module 116 may confirm user information 120 with credentials located on another device in system 100.

Step 514 executes by determining whether user information 120 is valid. If no, then step 516 executes by sending an alert to the user. The alert may be sent to port monitor 108. Browser 119 may redirect the user back to login page 602. Further, claim code 117 is not claimed for print job 113 by the user. Thus, it stays stored on server 110. After a condition is met, claim code 117 may not be valid. Step 518 executes by determining whether a condition to delete claim code 117 is met. A condition may include a predetermined period of time stored on server 110, a number of unsuccessful attempts to authenticate the user, and the like. If yes, step 520 executes by deleting claim code 117 along with related database entries and files from database 118. This data may be deleted for security and storage allocation purposes. Cloud-based server 110 does not want limited resources devoted to unclaimed print jobs. If step 518 is no, then flowchart 500 proceeds back to step 510.

If step 514 is yes, then the user is validated and successfully authenticated. Flowchart 500 proceeds to step 522. Step 522 executes by assigning claim code 117 to the user. Claim code 117 may be assigned to the user session between the user and cloud-based server 110. As disclosed above, if a valid user session already exists when claim code 117 is provided by claim code URL address 121, then the claim code is assigned to that session so that the user does not need to re-enter user information 120. Browser 119 may not be redirected to login page 602.

Step 524 executes by retrieving print job 113 on cloud-based server 110. After successful association of claim code 117 to the user, the user will see the print job in his/her job list for print jobs stored on the server. The job list may be displayed in browser 119. Step 526 executes by selecting print job 113 from the job list. Step 528 executes by sending the data for print job 113, including raw data 109, to printing device 104. In some embodiments, cloud-based server 110 sends print job 113 to printing device 104 such that application 132 is not involved in the printing process after port monitor 108 is done. Application 132 and port monitor 108 may be released to perform other operations, including those not involving server 110 or printing device 104.

Figure 7:
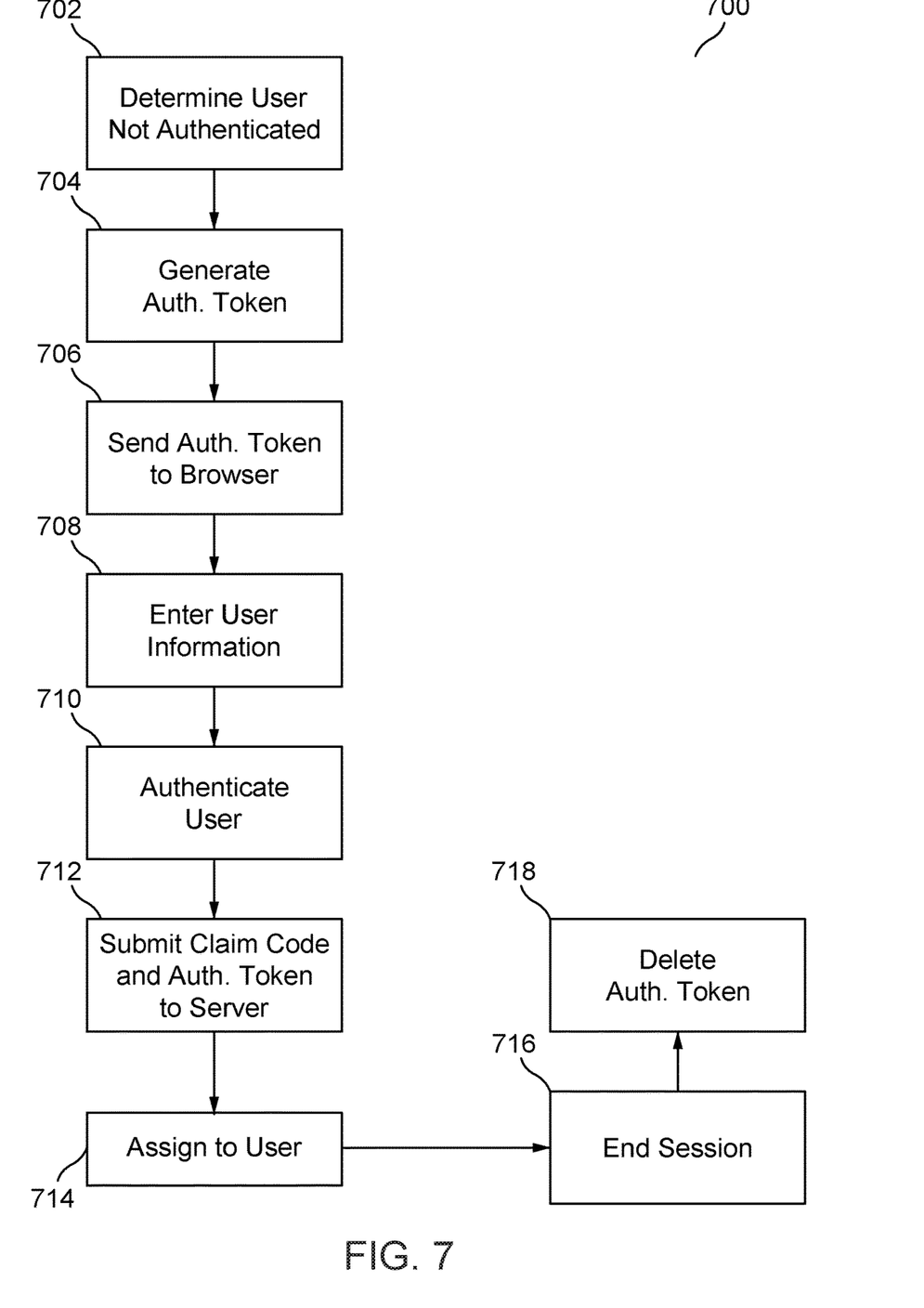
FIG. 7 illustrates a flowchart for authenticating user to access the print job from the cloud-based server using an authentication token according to the disclosed embodiments.

FIG. 7 depicts a flowchart 700 for authenticating user to access the print job from the cloud-based server using an authentication token 616 according to the disclosed embodiments. The disclosure of flowchart 700 may refer to elements of FIGS. 1A, 1B, 2, and 6 in disclosing the features of FIG. 7. Flowchart 700, however, is not limited to the embodiments disclosed by FIGS. 1A, 1B, 2, and 6. Flowchart 700 also may execute in conjunction with flowchart 500 disclosed above.

Step 702 executes by determining that the user is not authenticated after receiving claim code 117 using claim code URL address 121, as disclosed above. As disclosed by flowchart 500, if a valid and authenticated user session exists, then authentication processes may not be executed. One way to determine whether such a user session exists is to determine whether an authentication token 616 is associated with the session. Authentication token 616 may indicate that the user information is received and confirmed at cloud-based server 110.

Step 704 executes by generating authentication token 616 in order to authenticate the user retrieving print job 113. Authentication token 616 may be a string of data associated with the user or this session to authenticate the user. Cloud-based server 110 generates authentication token 616. For example, authentication service module 116 may generate authentication token 616 when browser 119 is redirected to login page 602.

Step 706 executes by sending authentication token 616 to browser 119. Browser 119 already has claim code 117, as provided by port monitor 108. Step 708 executes by entering user information 120 using login page 602, as disclosed above. Step 710 executes by authenticating the user with user information 120. In some embodiments, cloud-based server may generate authentication token 616 after user information 120 is validated.

Step 712 executes by submitting claim code 117 and authentication token 616 to cloud-based server 110. Browser 119 may submit these items along with user information 120. In other embodiments, browser 119 may submit these items when requested by cloud-based server 110. Step 714 executes by assigning claim code 117 to the user. Further, authentication token 616 may be assigned to the session between the user and the server. The user may print to printing device 104 from cloud-based server 110 during the session.

Step 716 executes by ending the session. Step 718 executes by deleting authentication token 616 from cloud-based server 110 and, if applicable, from browser 119. To initiate a new session to access a print job, the user will need to login again using the disclosed embodiments. Thus, a new authentication token will be generated at that time. A determination may be made to delete authentication token 616 depending on the content of the token. Further, deletion of authentication tokens may depend on the architecture of system 100 and cloud-based server 110. In some embodiments, authentication token 616 may not be stored on cloud-based server 100 and, therefore, will not need to be deleted.

If tokens are stored on cloud-based server 110, then step 718 may need to be executed. If authentication token 616 is a random string, then it should be stored in database 118 of cloud-based server 110. When a request comes with authentication token 616, cloud-based server 110 makes a database lookup to see if such a token exists. Cloud-based server 110 may determine properties within authentication token 616, such as expiry or expiration date/time, ownership, when submitted, and the like. Cloud-based server 110 may make the database read for every client call. This approach may not be suitable for systems having multiple independent servers, such as in a distributed system.

In some embodiments, authentication token 616 is encrypted and contains important properties that become readable when decrypted. One of the token properties may be the expiry timestamp. In these embodiments, cloud-based server 110 only need to decrypt authentication token 616 to check its validity. No database read by cloud-based server 110 is needed. This approach may be faster than the one using a stored authentication token 616 in database 118. Authentication token 616 becomes invalid when it expires, such as within an hour or less. Thus, step 712 may execute by determining whether authentication token 616 expired when it is received by cloud-based server 110.

The disclosed embodiments include processes to submit a print job to a cloud-based server, authenticate the user for accessing the print job, and claim the print job later for printing or other operations. The claim code issued in the processes claims the print job and is not associated with the user upon generation. Most applications authenticate the user then perform print processing. Printing operations are stopped to wait for authentication. A port monitor may not be able to authenticate and stops printing operations. The disclosed embodiments avoid such delay and inefficient use of printing resources by letting the printing process proceed without interruption.

Authentication may be done on a website associated with the cloud-based server. Authentication is not done on the port monitor. Further, the port monitor does not need a user interface to authenticate the user. It is done elsewhere, such as a browser, application, GUI on a mobile device, and the like.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an" and "the" are intended to include plural forms as well, unless the context clearly indicates otherwise. It will be further understood that the terms "comprises" and/or "comprising," when used in this specification, specific the presence of stated features, integers, steps, operations, elements, and/or components, but do not preclude the presence or addition of one or more other features, integers, steps, operations, elements, components, and/or groups thereof.

Embodiments may be implemented as a computer process, a computing system or as an article of manufacture such as a computer program product of computer readable media. The computer program product may be a computer storage medium readable by a computer system and encoding a computer program instructions for executing a computer process. When accessed, the instructions cause a processor to enable other components to perform the functions disclosed above.

The corresponding structures, material, acts, and equivalents of all means or steps plus function elements in the claims below are intended to include any structure, material or act for performing the function in combination with other claimed elements are specifically claimed. The description of the present invention has been presented for purposes of illustration and description, but is not intended to be exhaustive or limited to the invention in the form disclosed. Many modifications and variations will be apparent to those of ordinary skill without departing from the scope and spirit of the invention. The embodiment was chosen and described in order to best explain the principles of the invention and the practical application, and to enable others of ordinary skill in the art to understand the invention for embodiments with various modifications as are suited to the particular use contemplated.

One or more portions of the disclosed networks or systems may be distributed across one or more multi-functional printer (MFP) systems coupled to a network capable of exchanging information and data. Various functions and components of the MFP system may be distributed across multiple client computer platforms, or configured to perform tasks as part of a distributed system. These components may be executable, intermediate or interpreted code that communicates over the network using a protocol. The components may have specified addresses or other designators to identify the components within the network.

It will be apparent to those skilled in the art that various modifications to the disclosed may be made without departing from the spirit or scope of the invention. Thus, it is intended that the present invention covers the modifications and variations disclosed above provided that these changes come within the scope of the claims and their equivalents.

What is claimed is:

1. A method for authenticating user access to a print job at a cloud-based server, the method comprising:
   uploading job data for the print job to the cloud-based server using a port monitor;
   generating a claim code by the cloud-based server;
   providing the claim code to the port monitor;
   launching a browser with a uniform resource locator (URL) address indicating the cloud-based server, wherein the URL address includes the claim code;
   receiving an authentication token at the browser from the cloud-based server;
   authenticating user information at the browser;
   assigning the authentication token to the claim code; and
   submitting the claim code and the authentication token to the cloud-based server to access the print job.

2. The method of claim 1, further comprising initiating a redirection from the port monitor to launch the browser.

3. The method of claim 1, wherein the uploading includes streaming the job data for the print job to the cloud-based server.

4. The method of claim 1, wherein the uploading includes buffering the job data for the print job and uploading the buffered job data to the cloud-based server.

5. The method of claim 1, wherein the uploading includes buffering the job data for the print job at the cloud-based server.

6. The method of claim 1, further comprising sending the print job to a printing device from the cloud-based server.

7. The method of claim 6, further comprising generating the authentication token at the cloud-based server.

8. The method of claim 1, further comprising determining a user is not authenticated at the cloud-based server upon receipt of the claim code and not the authentication token.

9. The method of claim 1, wherein authenticating the user includes receiving a username or password in the browser.

* * * * *